United States Patent [19]

Forre

[11] Patent Number: 4,490,897
[45] Date of Patent: Jan. 1, 1985

[54] DEVICE FOR REPLACING FRONT SUSPENSION COMPONENTS IN A VEHICLE

[76] Inventor: Alf M. Forre, 5540, Fordesfjorden, Norway

[21] Appl. No.: 432,904
[22] PCT Filed: Jan. 29, 1982
[86] PCT No.: PCT/NO82/00002
  § 371 Date: Sep. 23, 1982
  § 102(e) Date: Sep. 23, 1982
[87] PCT Pub. No.: WO82/02508
  PCT Pub. Date: Aug. 5, 1982

[30] Foreign Application Priority Data
Jan. 29, 1981 [NO] Norway ................. 810311

[51] Int. Cl.³ .......................................... B23P 19/04
[52] U.S. Cl. ................................... 29/252; 29/227; 29/402.08; 29/426.5; 254/10.5; 280/668
[58] Field of Search ............... 254/10.5; 280/668; 29/225, 227, 252, 402.08, 426.5

[56] References Cited

U.S. PATENT DOCUMENTS

| | | | |
|---|---|---|---|
| 1,342,529 | 6/1920 | Charland | 254/10.5 X |
| 1,429,024 | 9/1922 | Douglass | 254/10.5 X |
| 2,652,625 | 9/1953 | Perkins | 29/227 X |
| 2,789,342 | 4/1957 | Powell | 29/252 |
| 3,051,443 | 8/1962 | Castoe | 29/227 X |
| 3,067,500 | 12/1962 | Bliss | 29/227 |
| 3,099,875 | 8/1963 | Lelis | 254/10.5 X |
| 3,132,843 | 5/1964 | Brocato | 254/10.5 |
| 3,341,175 | 9/1967 | Branick | 29/227 X |
| 3,781,970 | 1/1974 | Ferdriksson | 29/252 X |
| 3,814,382 | 6/1974 | Castoe | 29/227 X |
| 3,973,314 | 8/1976 | Shultz | 25/225 |
| 4,034,960 | 7/1977 | Kloster | 254/10.5 |
| 4,036,473 | 7/1977 | Kloster | 29/227 X |
| 4,045,855 | 9/1977 | Kruk et al. | 29/252 |
| 4,054,983 | 10/1977 | Cowan | 29/227 |
| 4,105,188 | 8/1978 | Mendoza et al. | 254/10.5 |
| 4,219,918 | 9/1980 | Klann | 254/10.5 X |
| 4,276,684 | 7/1981 | Mattson | 254/10.5 X |
| 4,295,634 | 10/1981 | Spainhour et al. | 254/10.5 |

FOREIGN PATENT DOCUMENTS 2251550  4/1973  Fed. Rep. of Germany ..... 254/10.5

Primary Examiner—Mark Rosenbaum
Assistant Examiner—Ronald S. Wallace
Attorney, Agent, or Firm—Brumbaugh, Graves, Donohue & Raymond

[57] ABSTRACT

In the particular embodiment of the device for replacing components in a front suspension of a vehicle disclosed in the specification, a work bench has two arms one projecting from each side and each having a mounting plate to be affixed to a wheel hub of a suspension mounted on the bench, and a pressure cylinder acts on the arms to lift the mounting plates and thereby compress the springs of the front suspension components to facilitate dismantling and replacement thereof.

1 Claim, 2 Drawing Figures

DEVICE FOR REPLACING FRONT SUSPENSION COMPONENTS IN A VEHICLE

BACKGROUND OF THE INVENTION

This invention relates to a method for replacing front suspension components in a vehicle and a device to perform the method.

When there is damage to a front suspension traverse of a vehicle, the single front suspension components are taken from the damaged traverse and mounted on an intact front suspension traverse. Especially the spiral spring of the vehicle causes problems during such a dismantling as this spring has to be compressed before dismantling and be retained compressed when the components of the front suspension are moved to the intact front suspension traverse and mounted thereto.

SUMMARY OF THE INVENTION

The practical difficulties connected with the dismantling and fitting of those components to front suspension traverses, are overcome by the method and device according to the invention. Hereby a compression of the spring is effectuated in a safe manner by locking the spring and the dismantling and mounting respectively to the front suspension traverses are performed in a safe and accurate manner.

With the method according to the invention a damaged and an intact front suspension traverse are placed in parallel on a front suspension work bench, whereafter a mounting plate of a lifting arm is secured to the wheel hub of the damaged traverse, and a hydraulic or pneumatic cylinder is activated to lift the mounting plate of the lifting arm to force the wheel hub against the spiral spring of the traverse and to compress this, whereafter the spring is locked in a compressed condition, thereafter the front suspension components with the spring and the hub are dismantled from the traverse, the cylinder thereafter being deactuated, and the lifting arm with the components is moved to the intact front suspension traverse whereafter the components are mounted to the intact traverse and the locking of the spring is released.

The device according to the invention comprises a lifting arm protruding from each side of the front suspension working bench, being displaceably secured to a longitudinal shaft of the bench and comprising a lower arm and an upper arm being which are pivoted to each other. The upper arm is capable of turning out from and in towards the bench for fitting to different front suspension traverses, and the upper arm has a mounting plate which is adjustable in the hight for mounting to a wheel hub belonging to a front suspension traverse mounted in the bench. A hydraulic or pneumatic cylinder is provided in the bench, which upon activation is pressed against the lifting arm so that the mounting plate is lifted and compresses the spring of the front suspension components so much that dismantling and succesive mounting is simplified.

The subject matter of the invention provides a significant time reduction compared to known embodiments, such as disclosed in U.S. Pat. No. 3,067,500. The most wide spread method of today is based on the principles of this patent. Compared with the mentioned known device, the subject matter according to the present invention has the advantage of arranging the bench underneath the car, as the bench runs on wheels, the car thereby may be arranged on a double shafted lift in such a way that the complete front suspension may be dropped from the car directly in place on the front suspension bench and after the springs have been secured it may be transferred to another working place. Corresponding by the mounting after the repair is performed in the same way, without the need for physical strength which up until now very often has required two men's work.

As the front suspension bench may be moved a more convenient working position, there is accomplished what is looked upon as a considerable improvement. Additionally the hydraulic lifting arms perform the heaviest work.

BRIEF DESCRIPTION OF THE DRAWINGS

The device according to the invention is disclosed in the drawings, where FIG. 1 discloses a perspective view from the front of the front suspension bench with one intact and one damaged front suspension traverse mounted, and FIG. 2 discloses a perspective view of the connection between the lifting arms and the front suspension components.

DESCRIPTION OF PREFERRED EMBODIMENTS

Figure 1:
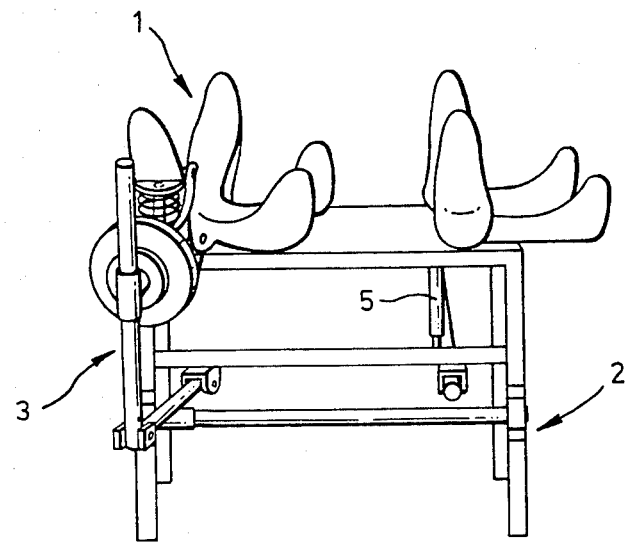
Figure 2:
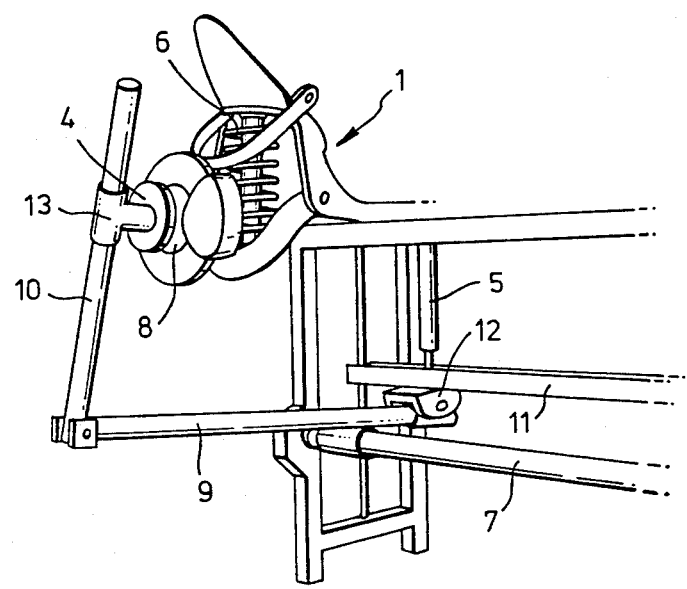

One intact and one damaged front suspension traverse 1 are mounted in parallel on the upper side of a front suspension bench 2 as shown in FIG. 1. A lifting arm 3 comprises a lower arm 9 and an upper arm 10, in the resting position creating an angle of 90° in respect to the lower arm 9 as shown in FIG. 2 and being pivotable 45° away from and toward the bench 2. The lower arm 9 is pivotally and displaceably mounted on a shaft 7 arranged along the lower side portion of the front suspension bench 2. A mounting plate 4 is slideably arranged on the upper arm 10 for fixation to a wheel hub 8, one of the front suspension components. Mounting plates 4, lifting arms 3 and shafts 7 are mounted in both longitudinal sides of the front suspension bench 2.

One end of the lower arm 9 is pivotally connected with the upper arm 10, whereas the other end of the lower arm 9 has an abutment means 12 by which force from a first beam 11 is applied to that end of the lower arm 9, the other end of the arm 9 upon rotation around the shaft 7 thereby being forced in opposite direction together with the upper arm 10 and the mounting plate 4.

The lifting arm 3 initially is displaced on the shaft 7 so that the mounting plate 4 may be mounted to the wheel hub 8. Then the guiding means 13 of the mounting plate 4 is secured to the upper arm 10 so that the abutment means 12 abuts against the thrust beam 11 when a pneumatic or hydraulic piston of a pressure cylinder 5 is placed in its inner most position abutting against the thrust beam 11 which again is forced against the piston rod by a helical spring (not shown).

Activation of the piston will force the thrust beam 11 against the abutment means 12, the lower arm 9 thereby being pivoted and pressed against the upper arm 10 with the mounting plate 4 and the wheel hub 8, the spring 6 of the vehicle thereby being compressed. When the spring 6 is compressed it is locked in this position the bench is moved to a convenient location and the front suspension components are dismantled from the front suspension traverse 1.

When the front suspension components are released from the front suspension traverse, the pressure cylinder 5 is deactivated and the lifting arm 3 with the front suspension components are displaced on the shaft 7 to the intact front suspension traverse. At the same time also the cylinder 5 is displaced to the intact front suspension traverse. Upon activating the cylinder 5, the front suspension components may be mounted on the intact front suspension traverse, the locking of the spring 6 may be released and the cylinder 5 deactuated upon which the mounting plate 4 may be released from the wheel hub 8.

I claim:

1. A device for replacing components in a front suspension of a vehicle comprising a front suspension working bench having means for affixing a front suspension traverse to the bench, a pair of lifting arms one protruding from each side of the front suspension working bench, the lifting arms being slideably secured to a longitudinal shaft in the bench and further comprising a lower arm and an upper arm pivotally connected to each other, the upper arm being arranged to be pivoted away from and in toward the bench so as to be adjustable to different front suspension traverses, the upper arm comprising a mounting plate which is adjustable in height for mounting to a wheel hub belonging to a front suspension traverse mounted in the bench, and a pressure cylinder arranged in the bench in such a way that upon actuation it is forced against the lifting arm, the mounting plate thereby being lifted to compress a spring of the front suspension components, dismantling and replacement thereby being simplified.

* * * * *